United States Patent
Baulier

(10) Patent No.: US 6,291,951 B1
(45) Date of Patent: Sep. 18, 2001

(54) HOLDING BRAKE CONTROL CIRCUIT FOR SERVO-MOTOR

(75) Inventor: Dominique Baulier, Windsor, CA (US)

(73) Assignee: Valiant Machine & Tool Inc. (CA)

( * ) Notice: Subject to any disclaimer, the term of this patent is extended or adjusted under 35 U.S.C. 154(b) by 0 days.

(21) Appl. No.: 09/531,834

(22) Filed: Mar. 21, 2000

(51) Int. Cl.$^7$ ....................................................... H02P 3/12
(52) U.S. Cl. ........................ 318/363; 318/362; 318/364; 318/368; 318/374; 318/379
(58) Field of Search ..................................... 318/362–381

(56) References Cited

U.S. PATENT DOCUMENTS

| | | | |
|---|---|---|---|
| 4,030,007 | * | 6/1977 | Price et al. ........................ 318/203 R |
| 4,348,625 | * | 9/1982 | Sharp .................... 318/757 |
| 4,754,211 | * | 6/1988 | Karjalainen ........................... 318/762 |
| 5,814,956 | * | 9/1998 | Kono et al. ........................... 318/380 |
| 6,078,156 | * | 6/2000 | Spurr .................... 318/368 |
| 6,084,365 | * | 7/2000 | Anderson et al. ................... 318/362 |

* cited by examiner

Primary Examiner—Robert E. Nappi
Assistant Examiner—Rita Leykin

(74) Attorney, Agent, or Firm—Gifford, Krass, Groh, Sprinkle, Anderson & Citkowski, P.C.

(57) ABSTRACT

A holding brake control circuit is provided for use in conjunction with a servo-motor having an electrically operated holding brake. The holding brake has a pair of electric brake terminals and the brake is retained in a released condition as long as at least a preset brake voltage is maintained to the brake terminals. The holding brake control circuit includes a pair of output terminals connected to the electric brake terminals as well as a pair of power input terminals electrically connected to an electric power source. The electric power source, furthermore, has a higher voltage than the preset brake voltage. At least one capacitor is electrically connected in parallel with the input terminals so that the capacitor charges when power is applied to the input terminals. A voltage regulator has power inputs connected in parallel with the capacitor and a regulated voltage output connected in parallel with the output terminals for the control circuit. The voltage regulator has a regulated output voltage greater than or equal to the preset brake voltage. Upon failure of the power supply or main power outage, the brake control circuit maintains the brake in a released condition for a period of time following failure of the power supply.

8 Claims, 1 Drawing Sheet

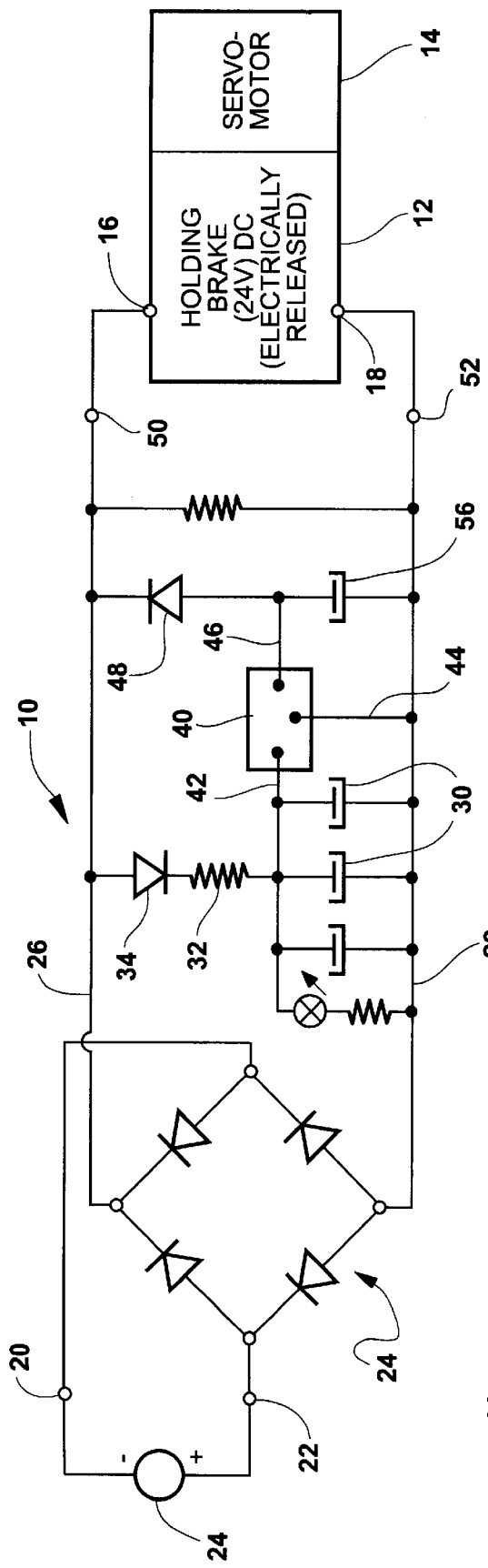
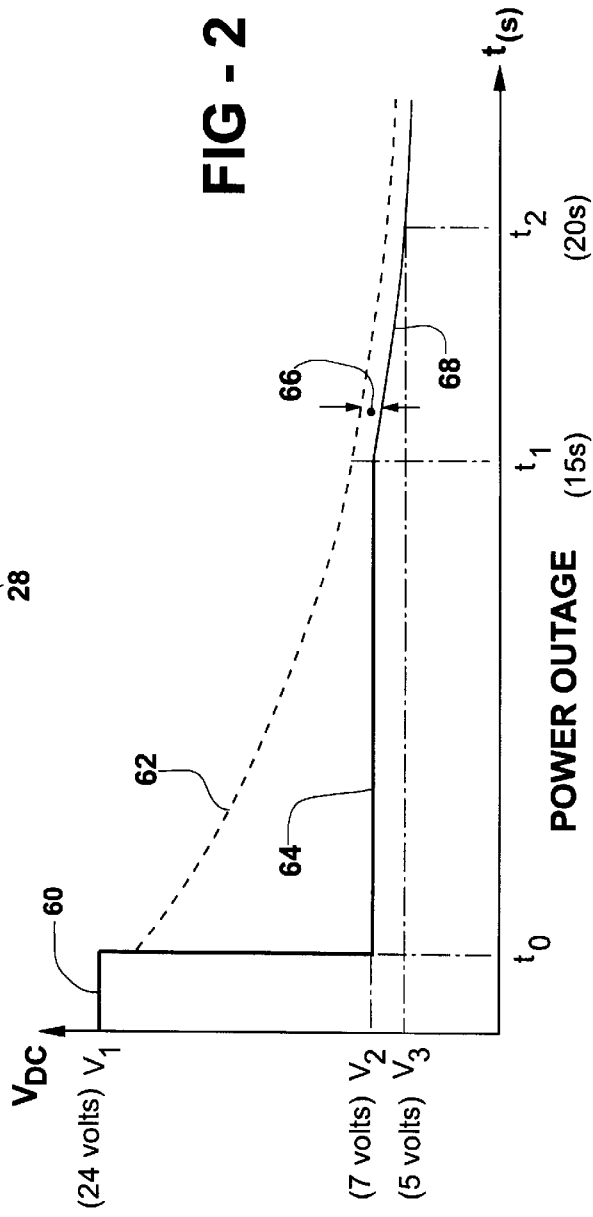

US 6,291,951 B1

HOLDING BRAKE CONTROL CIRCUIT FOR SERVO-MOTOR

BACKGROUND OF THE INVENTION

I. Field of the Invention

The present invention relates to a control circuit for a servo-motor D.C. holding brake.

II. Description of the Prior Art

Industrial manufacturing facilities, such as an automotive assembly plant, utilize electric servo-motors to drive some high inertia loads. For example, such electric motors are utilized to drive turrets, framing systems, and the like.

For safety reasons, these servo-motors are equipped with a "holding brake" to prevent any free motion of the system, when the servo-motor controller is disabled. Otherwise, such electric servo-motors could provide free movement of their load and potentially injure the manufacturing equipment, the manufactured item or even maintenance persons working on it.

There have been a number of previously known electric brakes for braking the electric servo-motor in the event of a power failure. Such electric brakes typically include a pair of input terminals which are connected to the power source which also powers the electric motor. Typically, a rectifier as well as a voltage reduction circuit is conventionally interposed between the power supply for the electric motor and the brake input terminals on the electric brake.

These previously known electric brakes maintain the brake in a released condition as long as the power input to the brake is greater than a preset threshold voltage, for example 5–6 volts. However, in the event of a power failure, the voltage input to the brake terminals for the electric brake falls below the preset voltage immediately thus causing the brake to activate and stop the motor.

Although these previously known electric holding brakes have proven effective for stopping the motors in the event of a power failure, in many cases, the load being moved by the electric motor is extremely massive. In these cases, the immediate braking action of the electric motor can result in extremely high torque and other stress imposed on both the motor holding brake as well as the load being moved by the motor. Such excessive forces in some cases are sufficient to not only damage, but also destroy the holding brake and/or transmission.

SUMMARY OF THE PRESENT INVENTION

The present invention provides a holding brake control circuit which overcomes all of the above-mentioned disadvantages of the previously known devices.

In brief, the holding brake control circuit includes a pair of output terminals which are connected to the brake terminals of the electric brake. Similarly, the control circuit includes a pair of power input terminals which are connected to the electric power source and this power source has a voltage greater than the preset voltage necessary to maintain the electric brake in a released condition.

One or more capacitors are connected in parallel with the input terminals so that, during normal operation, the power source both charges and maintains the capacitor in a charged condition.

The control circuit further includes a voltage regulator having input terminals and output terminals. The input terminals are connected in parallel with the capacitor while the output terminals from the voltage regulator are connected in parallel with the brake input terminals.

The voltage regulator is preferably a low drop out voltage regulator such as an NTE 1952 voltage regulator. Furthermore, the regulated voltage output from the voltage regulator is equal to or greater than the voltage necessary to maintain the electric brake in a released condition.

In operation, during normal operation the power supply charges the capacitor and, after charging, maintains the capacitors in a charged condition. Consequently, the voltage input to the voltage regulator is substantially the same, or slightly lower than, the voltage of the power supply. Furthermore, after charging the capacitors, the supply voltage is effectively electronically connected to the brake terminals thus maintaining the electric brake in a released condition.

In the event of a power failure, however, the charging voltage to the capacitors terminates, and the capacitor discharges its accumulated charge through the voltage regulator. In doing so, the charge from the capacitor is able to maintain the output voltage from the voltage regulator to the electric brake at or above the voltage necessary to maintain the electric brake in a released condition for a period of time, e.g. 20 seconds. This relatively long time delay between the time of power failure and the actuation of the electric brake allows the load previously driven by the servo-motor to slow down so that, at the time of brake actuation, the stresses and torque imposed on the motor and load are minimized.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a schematic view illustrating the preferred embodiment of the present invention; and FIG. 2 is a graph illustrating the operation of the preferred embodiment of the present invention.

DETAILED DESCRIPTION OF A PREFERRED EMBODIMENT OF THE PRESENT INVENTION

With reference to FIG. 1, a preferred embodiment of the brake control circuit 10 is shown for use with an electric D.C. holding brake 12 associated with a servo-motor 14. The servo-motor 14 drives a load (not shown), typically in an industrial facility.

The electric holding brake 12 includes a pair of electric brake terminals 16 and 18. In the conventional fashion, as long as the voltage applied to the brake terminals 16 and 18, which has previously reached the release tension (15 to 18 volts), remains greater than a preset brake voltage, e.g. 5 volts DC, the electric brake 12 is maintained in a released condition. Conversely, whenever the voltage across the terminals 16 and 18 falls below the preset brake voltage, the electric brake 12 actuates thus braking the motor 14.

The brake holding control circuit 10 includes a pair of power input terminals 20 and 22 which are connected to a source of power 24. The source of power 24 has a higher voltage, for example 24 volts, than the preset brake voltage for a reason to be subsequently described.

The input terminals 20 and 22 are connected to a rectifier circuit 24 which is preferably a diode bridge. As such, the diode bridge 24 provides a positive voltage output on an output line 26 and, likewise, a negative or ground voltage level on its output line 28. The rectifier bridge 24 ensures that the line 26 is positive voltage and the line 28 is negative or ground voltage even in the event that the power supply 24 is a direct current power supply or that the connections between the power supply 24 and the input terminals 20 and 22 are reversed.

At least one, and preferably several capacitors 30 are connected in parallel between the power supply lines 26 and 28 from the rectifier bridge 24. Preferably, a current limiting resistor 32 is also connected in series with the capacitors 30 to be loaded, to protect the capacitors 30 from transient current spikes. Additionally, a diode 34 is also connected in series with the capacitors 30 and resistor 32 to prevent current flow back from the capacitors 32 through the resistor 32 when the power supply 24 disappears.

During normal operation, i.e. when the power supply 24 is active, the power supply 24 charges the capacitor 30 via the bridge 24, diode 34 and resistor 32 to a voltage which is substantially the same as the voltage of the power supply 24 less voltage drops caused by the diode 34 and rectifier circuit 24. After the capacitors 30 have been initially charged by the power supply 24, the power supply 24 maintains the capacitors 30 in a charged condition.

The brake control circuit 10 further includes a low drop out voltage regulator 40 having input terminals 42 and 44 and output terminals 46 and 44, i.e. the output or ground terminal of the voltage regulator 40 is the same for both the input terminals and output terminals.

The voltage regulator 40 is a low drop out voltage regulator, such as an NTE 1952 which maintains a regulated voltage output on the output terminals 46 and 44 as long as the voltage on the input terminals 42 and 44 meet or exceed the regulated output voltage. Furthermore, the regulated output voltage from the voltage regulator 40 is at least equal to and preferably slightly greater than the preset brake voltage necessary to maintain the electric brake 12 in a released condition.

The input terminals 42 and 44 of the voltage regulator 40 are connected in parallel with the capacitors 30 so that, when the capacitors 30 are charged by the power supply 24, a voltage level of slightly less than the voltage level of the power supply 24 is maintained across the input terminals of the voltage regulator 40. Conversely, the output terminals 46 and 44 from the voltage regulator 40 are connected in parallel via a diode 48 to the brake input terminals 16 and 18 via output terminals 50 and 52 from the brake control circuit 10. A resistor, such as a 500 ohm 10 watt resistor, is connected in parallel with the terminals 50 and 52 while a capacitor 56, such as a 100 microfarad capacitor, is connected between the voltage regulator output terminals 46 and 44 to minimize voltage spikes and add stability to the brake control circuit.

With reference now to both FIG. 1 and FIG. 2, the operation of the brake control circuit will now be described. During normal operation, i.e. in the absence of a power failure, the voltage input to the voltage regulator 40 is maintained at a preset constant voltage $V_1$ as shown at 60. The actual voltage $V_1$ is slightly less than the voltage of the power supply 28 due to voltage drops across the diode 34 and the diodes in the bridge circuit 24.

Assuming a power failure at time to seconds, the input voltage to terminals 20 and 22 immediately drops to zero. When this occurs, the capacitor 30 begins to discharge as shown by graph 62 through the voltage regulator so that the voltage regulator maintains the output voltage to the electric brake 12 at a voltage level $V_2$ as shown by graph 64. The voltage $V_2$, furthermore, is higher than the voltage $V_3$ below which brake actuation occurs so that the voltage regulator 40 maintains the voltage to the electric brake terminals 16 and 18 at a voltage level sufficient to maintain the electric brake 12 in a released condition.

In practice, the discharge from the capacitor 30 is able to maintain the output from the voltage regulator 40 at its regulated voltage output for approximately 15 seconds until time $t_1$ when the voltage across the capacitor 30 substantially equals or is slightly less than the regulated voltage output from the voltage regulator 40. The regulated output voltage from the voltage regulator 40 then drops exponentially in synchronism with the capacitor 30 voltage discharge curve 62 as shown at 68 until time $t_2$, illustrated at 20 seconds, in which the voltage output from the voltage regulator 40 drops to less than voltage $V_3$ thus causing actuation of electric brake 12.

In practice, it has been found that, by delaying the brake actuation for a relatively lengthy period, e.g. 20 seconds, following a power failure, the motor is sufficiently slowed or even stopped so that actuation of electric brake 12 does not cause undue torque or tension to the motor or its load.

From the foregoing, it can be seen that the present invention provides a brake control circuit which is simple, inexpensive and yet effective in operation. Having described my invention, however, many modifications thereto will become apparent to those skilled in the art to which it pertains without deviation from the spirit of the invention as defined by the scope of the appended claims.

I claim:

1. For use in conjunction with a servo-motor having an electrically operated holding brake, said holding brake having a pair of electric brake terminals in which the brake remains in a released condition as long as at least a preset brake voltage is maintained to the electric brake terminals, a brake control circuit comprising:

a pair of output terminals connected to said pair of electric brake terminals, a pair of power input terminals connected to an electric power source, said power source having a higher voltage than said preset brake voltage, at least one capacitor electrically connected in parallel with said input terminals, a voltage regulator having power inputs connected in parallel with said capacitor and having a regulated voltage output connected in parallel with said output terminals, said voltage regulator having a regulated voltage output greater than or equal to said preset brake voltage, whereby, upon failure of said power supply, said holding brake control circuit maintains said holding brake in a released condition for a period of time following said power supply failure.

2. The invention as defined in claim 1 wherein said voltage regulator comes in standard with a current limitation to avoid any destruction in case of short circuit perform on the brake feeder.

3. The invention as defined in claim 1 wherein said voltage regulator is a low dropout voltage regulator, to reduce the size requested for the capacitor.

4. The invention as defined in claim 1 and comprising means for limiting current flow into said capacitor during charging of said capacitor.

5. The invention as defined in claim 1 wherein said at least one capacitor comprises at least two capacitors.

6. The invention as defined in claim 1 and comprising a rectifier bridge electrically connected in series between said input terminals and said capacitor.

7. The invention as defined in claim 1 and comprising diodes to orient the capacitor unloading current through the voltage regulator, to the holding brake.

8. The invention as defined in claim 1 and comprising an LED visualization of the capacitor loading and a capacitance discharge resistance, to monitor and dissipate all electrical energy after a while, even in case of coil brake failure.

* * * * *